United States Patent

[11] 3,586,171

| [72] | Inventor | Robert J. Offer |
| | | Racine, Wis. |
| [21] | Appl. No. | 823,327 |
| [22] | Filed | May 9, 1969 |
| [45] | Patented | June 22, 1971 |
| [73] | Assignee | Tenneco Inc. |
| | | Houston, Tex. |

[54] COMBINATION DUAL-FLOW AND TWO-STAGE FILTER
13 Claims, 2 Drawing Figs.

[52] U.S. Cl. ............................................... 210/136,
210/314, 210/438
[51] Int. Cl. ..................................................... B01d 35/14,
B01d 27/10
[50] Field of Search........................................... 210/136,
314, 130, 132, 133, 134, 137, 323, 437, 438

[56] References Cited
UNITED STATES PATENTS
2,928,499  3/1960  Hallinger........................ 210/134 X
3,120,490  2/1964  Samson ......................... 210/132
3,467,256  9/1969  Humbert, Jr. et al. ......... 210/137 X

*Primary Examiner*—Frank A. Spear, Jr.
*Attorney*—Harness, Dickey & Pierce

ABSTRACT: An oil filter for internal combustion engines has filter elements of two different flow rates arranged in parallel so that in general the high flow rate material acts as a full flow filter and filters oil going to the bearings and the low flow rate material acts as a bypass filter and filters oil that is returned to the crankcase. Automatic modification of this general dual-flow arrangement and control of flow through the low flow rate material is provided by orifice means that connects the outlet sides of the two filter elements. This means includes a hole that is controlled by a one-way valve which prevents flow from the high-flow outlet side to the low-flow outlet side but permits it in the reverse direction and may also include an open bleed hole.

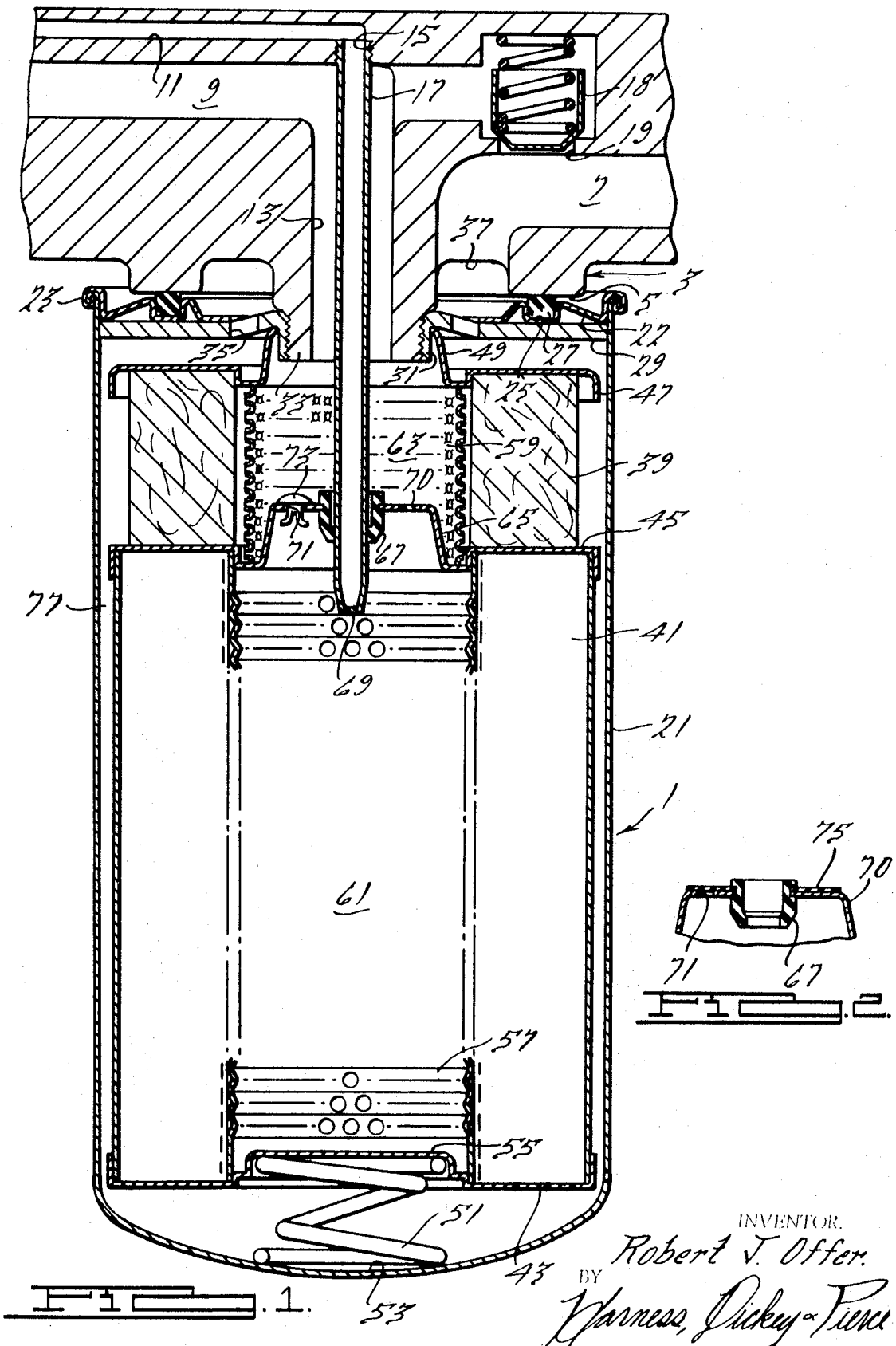

COMBINATION DUAL-FLOW AND TWO-STAGE FILTER

BACKGROUND OF THE INVENTION

In lubrication systems for internal combustion engines the oil pump forces oil from the crankcase, which is at substantially atmospheric pressure, to a filter at a delivered pressure of approximately 40 p.s.i. When the filter outlet is connected directly to the bearings or other points requiring lubrication (i.e. full flow arrangement), a pressure differential of no more than about 8 p.s.i. is available since at pressure drops in excess of that a bypass valve responsive to the difference between inlet and outlet pressures on the filter opens so that oil flows directly from the pump to the bearings. On the other hand, if the filter outlet is connected to the crankcase at atmospheric pressure (i.e. bypass flow), approximately 40 p.s.i. is available to effect flow through the filter. Proper use of this greater pressure differential permits finer or more efficient filters to be used and permits filtering for a longer period of time than can be achieved when only relatively low full flow pressure drops are used.

BRIEF SUMMARY OF THE INVENTION

Basically, it is the object of this invention to increase the life and filtering efficiency that may be obtained in an ordinary size automotive throwaway-type filter.

In accomplishing this and other objects, the invention in preferred form provides a compact filter housing containing a fine or low flow rate filter element and a coarse or high flow rate filter element positioned in parallel arrangement so that incoming oil can flow through one or the other of the elements. The filter is arranged for dual operation by wall means which separates the outlet chambers for the two elements and by means for connecting the fine filter outlet chamber to the crankcase or sump of the engine and for connecting the coarse filter outlet chamber to the engine bearings or points to be lubricated. The wall means preferably includes a one-way valve permitting flow from the fine filter outlet to the coarse filter outlet, but prevents reverse flow, and when open the filter functions primarily as a parallel filtering unit and secondarily as a dual filtering unit. The wall means also preferably includes a bleed hole permitting restricted flow between the two chambers which automatically and beneficially modifies the dual-flow arrangement in accordance with the relative pressures in the two outlet chambers with the result that, as compared with no bleed hole, there is a faster warmup of the fine filter and an increased flow through it, which increase is used in parallel flow operation so that it flows to the bearings.

Thus, more generally, the invention provides a combination of two filter media with automatic means for beneficially adjusting the degree of parallel flow and dual operation of the two filters in accordance with the relative pressures on the outlet sides of the filters. Further, the invention provides a control means for the operation of the denser filter element of a two media filter which insures its greater utilization when the coarser filter element is at minimum efficiency and which prevents the velocity of flow through the denser medium in either parallel flow or dual operation from exceeding the rate at which the medium will function at the desired efficiency. Still further, the invention provides a combination dual and parallel flow filter through which there will be a continuous flow of oil to the bearings and crankcase regardless of the temperature or viscosity of the oil.

DESCRIPTION OF THE DRAWINGS

FIG. 1 is an axial cross section through an oil filter embodying the invention and shows it attached to a typical oil filter base containing oil flow passages; and FIG. 2 is a partial cross section showing a modified bleed valve arrangement.

DESCRIPTION OF THE INVENTION

The throwaway oil filter 1 is mounted on an oil filter base 3 to seat on the annular flat surface 5. The base 3 has an oil passage 7 which delivers oil from the oil pump (not shown) to the filter 1 and an oil passage 9 which receives filtered oil and delivers it to the bearings or other points being lubricated. The base 3 also has a passage 11 which delivers oil to the sump or crankcase (not shown). The passage 9 has a section 13 which is coaxial with the seating surface 5 and one side of this passage is drilled and tapped as seen at 15 to open into the passage 11 and support a tubular probe 17 which is coaxial with the passage 13 and the surface 5. A spring-pressed bypass or pressure relief valve 18 controls flow through bypass passage 19 that connects inlet passage 7 with outlet passage 9 and in automobile engine lubrication system applications is usually constructed to open if the pressure in filter outlet passage 9 drops to approximately 8 p.s.i. less than the pressure in inlet passage 7. The oil in passage 7 comes from the outlet side of the oil pump (not shown) and is usually at a pressure of about 40 p.s.i. so the minimum pressure in passage 9 is approximately 32 p.s.i. On the other hand, since outlet passage 11 leads to the oil sump or crankcase, it carries oil at pressures approaching atmosphere.

The oil filter 1 may be of various constructions and contain various filter media. In the device chosen to illustrate the invention, there is a cup-shaped outer shell 21 which has a closure plate 22 at one end which is interlocked at 23 with the end of the shell. The plate 21 has an annular socket 25 which holds a resilient gasket 27 that is held in sealing engagement with the filter base surface 5. Adjacent the end 21 is a transverse reenforcement plate 29 which has a threaded central boss section 31 which can thread onto an externally threaded projection 33 on the base. It is apparent that by screwing the filter on the projection 33 the gasket 27 will be pressed against the filter base surface 5 in a fluidtight engagement. Within the area of the seal 27 the plate 29 has a series of ports 35 which open into an annular chamber 37 in the base 3 that receives oil from pump passage 7 and oil to be filtered flows through these ports to the inside of the filter housing 21.

Inside of the shell 21 is a dual flow rate filter means 38 which comprises a high flow rate or coarse filter element 39 that initially has a relatively low resistance to oil flow through it and a low flow rate or fine filter element 41 that, preferably, has initially even less restriction than section 39 but as it collects contaminants more rapidly it becomes more restrictive to flow than section 39. The elements 39 and 41 are preferably annular with their outer faces as the inlet side and their inner faces as the outlet side. The relative resistance and size of the two elements and probe inlet size is preferably such that approximately twice as much oil flows through element 39 as through element 41, i.e., for a 6 g.p.m. filter approximately 4 gallons will flow through element 39 and 2 gallons through element 41.

The filter element 39 is of the depth type and is preferably formed from uniform diameter viscose rayon or other suitable synthetic fibers which have preferably been resin coated and bonded to each other by heating and curing under compression in a mold to form a uniform, homogeneous, and relatively rigid self-sustaining body resistant to dimensional changes. The porosity, resistance, and density of such an element can be precisely controlled even in mass production thereby furnishing close design control over the performance of the total filter 1. For automotive use it preferably excludes particles above about 80 microns in size when it is clean. The filter element 41 is preferably formed from a low porosity oil filter paper such as one of those now used in automotive oil filters which exclude particles above about 10 microns in size when it is clean. It is preferably pleated, as is conventional, to increase its surface area, the pleats being held in fixed position by being adhered through plastisol or the like to end caps 43 and 45 as is also conventional. The high flow element 39 is preferably also adhered at one end to an end cap 47 and the other end may be adhered to end cap 45 or simply pressed tightly enough against it by the assembly to prevent bypassing of oil. The end cap 47 has an annular section 49 which engages the plate 29 to act as a spacer and is pressed against the plate 29 by the spring 51 which acts between the end 53 of the shell 21 and the imperforate end cap 43 which has a recess 55 to receive it. The amount of axial compression applied to element 41 is limited by the perforate metal center tube 57 which extends between and is centered on end caps 43 and 45; and the amount of axial compression applied to element 39 is limited by prick punched metal center tube 59. The space inside tube 57 may be regarded as a low flow outlet chamber 61 and the space inside tube 59 as a high flow outlet chamber 63.

The two outlet chambers 61 and 63 are separated from each other by the central, separator wall portion 65 of the end cap 45. The wall 65 may be cup shaped as shown to increase its resistance to bending due to forces applied by tubular probe 17 which passes through sealing grommet 67 on the wall to connect the low flow chamber 61 to the sump passage 11. High flow chamber 63 is connected to the bearing passage section 13, around the outside of the probe 17 as seen in FIG. 1, which is large enough to provide free flow out of the filter 1. The probe 17, however, has a restricted inlet opening 69 that limits or meters flow to passage 11 and preferably acts in conjunction with the relative size and porosity of elements 39 and 41, as indicated above, to control flow so that approximately 10 percent goes to passage 11 during early stages of use of the filter 1. The size of the orifice 69 is such as to prevent excessive oil flow to the crankcase and starving of the bearings.

Automatic and beneficial modification of the selected outlet flow ratio between filter elements 39 and 41 is obtained by use of a hole 71 in wall 65 which is substantially larger in size than the orifice 69 but not so large in combination with orifices 69 and 70 (to be described) that the velocity of flow through the paper 41 exceeds the optimum rate to obtain the desired filtering efficiency. Flow through hole 71 is in one direction only, i.e., from chamber 61 to chamber 63, and reverse flow is prevented by the rivet type check valve 73 in FIG. 1 or the resilient disc valve 75 in the modification of FIG. 2. When the valves 73 or 75 are open operation of the filter 1 is primarily parallel flow; and when closed operation is primarily dual flow.

Preferably, further automatic modification of the outlet flow ratio between the two filter elements is obtained by use of a bleed hole 70 in wall 65 which is substantially smaller in size than either one of orifices 69 and 71.

In overall operation, oil from the passage 7 enters the filter 1 through inlet ports 35 and flows outwardly in the common inlet chamber 77 surrounding the two filter elements 39 and 41. It then flows radially through and is filtered by the elements into outlet chambers 61 or 63 from which it flows through probe 17 to the sump or passage 11 to the bearings.

During the early life of the filter 1, before the paper element 41 has built up a restrictive cake of contaminants, the element 41 is less restrictive than the depth element 39 and the oil pressure in chamber 61 is higher than in chamber 63. For example, initially the pressure in chamber 61 (assuming an inlet pressure of 40 p.s.i.) may be about 38—39 p.s.i. and that in chamber 63 about 35—36 p.s.i. During this period of higher pressure in chamber 61, oil will flow through holes 70 and 71 (unseating valve 73 or 75) into chamber 63 and then to the bearings through passage 11. Thus, a substantial percent of flow to the bearings may be oil that has been filtered by the highly efficient fine flow paper element 41. During this period operation is primarily parallel flow. In one actual embodiment the various hole sizes were such that during early life the flow ratios were approximately 1.5 g.p.m. for hole 71, 0.5 g.p.m. for orifice 69, and 0.06 g.p.m. for hole 70.

During the later life of the filter, the paper element 41 becomes much more restrictive because of contaminant buildup and pressure in chamber 61 drops below that in chamber 63 so flow between the chambers is reversed, i.e., goes from chamber 63 to chamber 61 through bleed hole 70. At this time, however, the element 39 has become very efficient as a filter because of contaminant buildup. While the paper element 41 may load up in about 25 hours, the depth element has a life of about 50 hours and becomes increasingly more efficient as it loads up. Thus, a very efficient, long-life filter of a small overall size is obtained; and the desired efficiency throughout its life can be achieved by control and proportioning of the filter elements and hole sizes.

At times, such as during startup in cold weather or when high-viscosity oil is present, the pressure in chamber 61 may be less than in chamber 63 even during the early life of the filter. In this situation, the valve 73 or 75 is closed and a stream of warm oil is forced through bleed hole 70 to circulate within the paper element 41 to warm it and the viscous oil around it to speed the functioning of the filter 41.

Modifications in the specific structure illustrated can be made without departing from the spirit and scope of the invention. It is understood that a bypass valve for section 39 and/or an antidrainback valve for ports 35 can be incorporated in the filter 1 in accordance with known arrangements without affecting the essential structure or mode of operation of the invention.

I claim:

1. An oil filter for attachment to an oil filter base of an internal combustion engine, said base having a passage for incoming oil to be filtered and a passage for filtered oil to flow to the engine bearings and a passage including a tubular probe with a restricted opening for filtered oil to flow to the crankcase, said filter comprising a housing having oil inlet means, a high flow rate filter element in the housing arranged to receive oil from the inlet means, a low flow rate filter element in the housing arranged in parallel with the high-flow element to receive oil from the inlet means, first means defining an outlet chamber for oil passed through the high flow rate element, second means defining an outlet chamber for oil passed through the low flow rate element, hole means interconnecting said two outlet chambers to provide for flow from the chamber at higher pressure to the chamber at lower pressure, first outlet means for connecting said high flow rate outlet chamber to the passage in the base for filtered oil to flow to the bearings, and second outlet means for connecting the low flow outlet chamber to the probe for filtered oil to flow to the crankcase, said low flow rate filter element having an optimum maximum velocity of oil flow through it, the total area of said hole means and said probe restricted opening being such that the velocity of oil flow through said low flow rate element does not substantially exceed said optimum maximum velocity.

2. A device as set forth in claim 1 wherein said hole means includes a check valve controlled opening providing for flow only from the second means to the first means, said opening being substantially larger in size than said probe restricted opening.

3. A device as set forth in claim 2 wherein said hole means includes a permanently open bleed hole which is substantially smaller in size than said probe-restricted opening.

4. In a liquid filter having a housing with an inlet and an outlet for liquid to enter and leave the filter, first and second filter elements mounted inside the housing and arranged in parallel with respect to liquid flow from said inlet to said outlet, means defining an outlet chamber for said first filter element which communicates with said filter outlet, means defining an outlet chamber for said second filter element including a wall separating it from the outlet chamber for the first filter element, a permanent opening in said wall connecting the two outlet chambers for liquid flow in either direction from one to the other, a check valve controlled opening in said wall providing for flow only from the second filter element outlet chamber to the first filter element outlet chamber but preventing flow in the reverse direction, said first filter element being relatively coarse and said second filter element being relatively fine in porosity, said second filter element having an optimum maximum velocity of liquid flow through it, the total area of said openings being such that the velocity of liquid flow through said second filter element does not substantially exceed said optimum maximum velocity.

5. An oil filter for attachment to an oil filter base of an internal combustion engine, said base having passages for incoming oil to be filtered and for filtered oil to flow to the engine bearings and to the crankcase, said filter comprising a housing having oil inlet means, a high flow rate filter element in the housing arranged to receive oil from the inlet means, a low flow rate filter element in the housing arranged in parallel with the high flow element to receive oil from the inlet means, first means defining an outlet chamber for oil passed through the high flow rate element, second means defining an outlet chamber for oil passed through the low flow rate element, hole means interconnecting said two outlet chambers to provide for flow from the chamber at higher pressure to the chamber at lower pressure, first outlet means for connecting said high flow rate outlet chamber to the passage in the base for filtered oil to flow to the bearings, said second outlet means for connecting the low-flow outlet chamber to the passage in the base for filtered oil to flow to the crankcase, said high-flow element being annular and the space inside it comprising said high flow rate outlet chamber.

6. An oil filter as set forth in claim 5 wherein said low-flow element is annular and the space inside it comprises said low flow rate outlet chamber.

7. An oil filter as set forth in claim 6 wherein said hole means includes a first bleed hole that is permanently open and a second hole having valve means therein providing for flow in one direction only from the low-flow outlet chamber to the high-flow outlet chamber.

8. An oil filter for attachment to an oil filter base of an internal combustion engine, said base having passages for incoming oil to be filtered and for filtered oil to flow to the engine bearings and to the crankcase, said filter comprising a housing having oil inlet means, a high flow rate filter element in the housing arranged to receive oil from the inlet means, a low flow rate filter element in the housing arranged in parallel with the high-flow element to receive oil from the inlet means, first means defining an outlet chamber for oil passed through the high flow rate element, second means defining an outlet chamber for oil passed through the low flow rate element, hole means interconnecting said two outlet chambers to provide for flow from the chamber at higher pressure to the chamber at lower pressure, said hole means including a hole having valve means therein providing for flow in one direction only from the low-flow outlet chamber to the high flow outlet chamber, first outlet means for connecting said high flow rate outlet chamber to the passage in the base for filtered oil to flow to the bearings, and second outlet means for connecting the low-flow outlet chamber to the passage in the base for filtered oil to flow to the crankcase.

9. An oil filter as set forth in claim 8 wherein said hole means includes a bleed hole that is permanently open and which is substantially smaller in size than said valved hole.

10. A filter device as set forth in claim 9 wherein said high-flow element is a depth type filter comprising a homogeneous body of resin-coated and cured uniform-diameter synthetic fibers having a preselected porosity and flow resistance.

11. A filter device as set forth in claim 10 wherein said low-flow element is a filter paper type element having initially less resistance to flow than the high-flow element but collecting contaminant at a greater rate than said high-flow element so that after a short period of use it has a greater resistance to flow than said high-flow element.

12. A filter as set forth in claim 8 wherein said first and second means include a separator wall between said filter elements and said hole means is formed in said separator wall.

13. A filter device as set forth in claim 12 wherein said wall includes a grommet to sealingly receive a tube on said base forming a part of the passage for oil to flow to the crankcase.